UNITED STATES PATENT OFFICE.

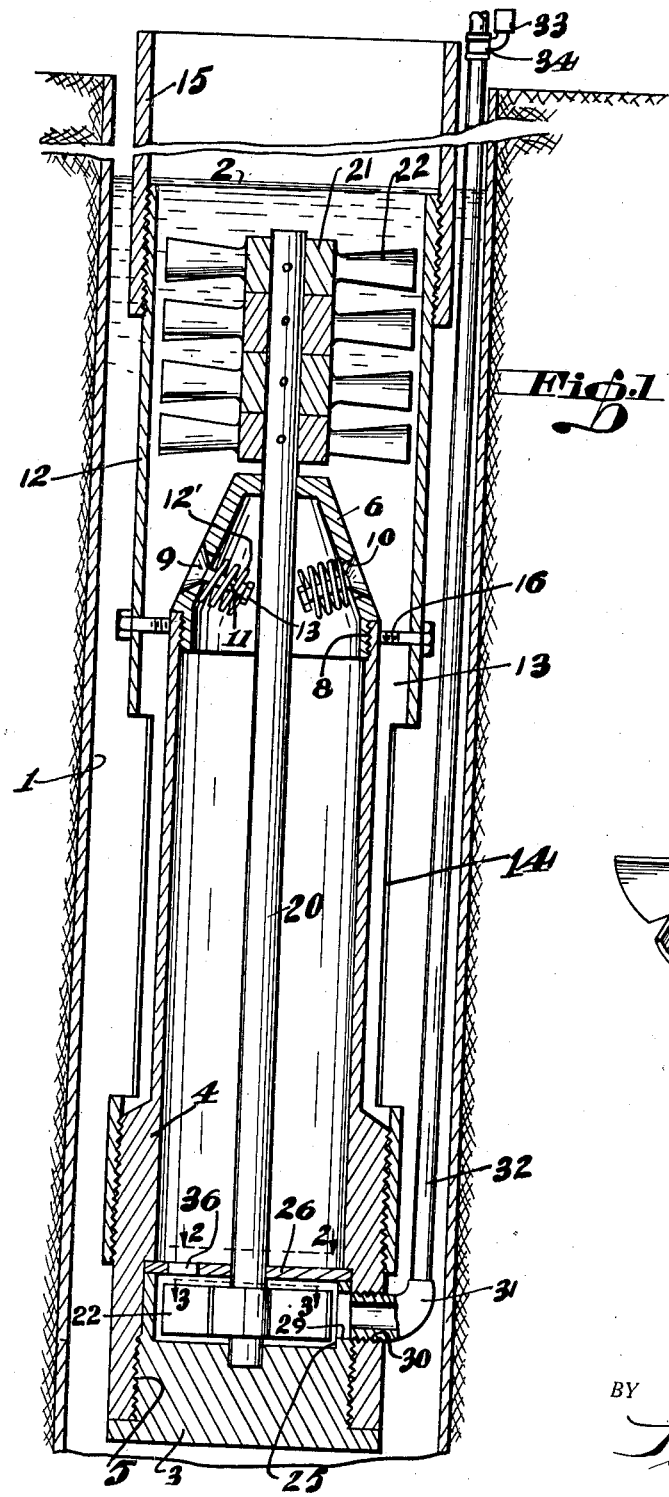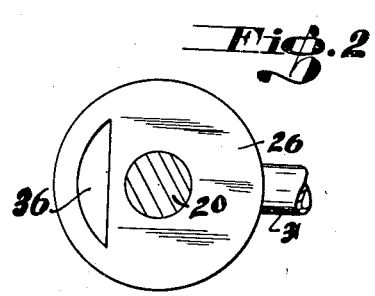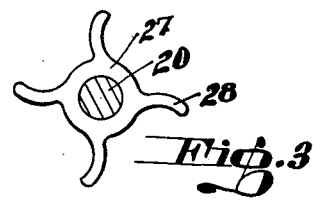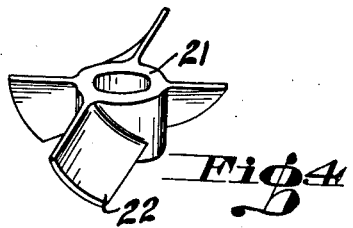
R. H. TUCKER.
AIR LIFT.
APPLICATION FILED MAY 11, 1920.
1,365,210.
Patented Jan. 11, 1921.
Fig. 1
Fig. 2
Fig. 3
Fig. 4
INVENTOR.
Ralph H. Tucker
BY
Hazard & Miller
ATTORNEYS

RALPH H. TUCKER, OF LOS ANGELES, CALIFORNIA.

AIR-LIFT.

1,365,210.

Specification of Letters Patent.   Patented Jan. 11, 1921.

Application filed May 11, 1920. Serial No. 380,477.

*To all whom it may concern:*

Be it known that I, RALPH H. TUCKER, a citizen of the United States, residing at Los Angeles, in the county of Los Angeles and State of California, have invented new and useful Improvements in Air-Lifts, of which the following is a specification.

This invention is an air lift and has for its object the provision of an improved construction for lifting water or other liquid from a well.

The invention will be understood from the following description of the accompanying drawings, in which—

Figure 1 is a longitudinal section through a construction made in accordance with the invention.

Fig. 2 is a transverse section on the line 2—2 of Fig. 1.

Fig. 3 is a transverse section on the line 3—3 of Fig. 1.

Fig. 4 is a perspective view of one of the impellers for lifting the liquid.

The well in which the improved air lift is arranged to be sunk is shown at 1, the liquid level therein being shown at 2. The improved air lift comprises a base 3 sunk to the bottom of the well 1 and having a cylindrical casing 4 projecting upwardly therefrom. The cylindrical casing may be detachably connected to the base 3 as by the screw threaded connection 5. A cap 6 is arranged at the upper end of casing 4 and may be secured thereon by the screw threaded connection 8. The cap 6, is, preferably, frusto-conical in shape and valves 9 closing ports 10 are, preferably, arranged in the conical sides of the cap. The valves are shown as provided with tapering heads received upon tapering valve seats at the ports 10 to close said valves against pressure from the outside of the cap 6. The stems 11 of the valves are shown as surrounded by springs 12' received between collars 13 upon the ends of the valve stems and the walls of pipe 6. By this arrangement the valves are arranged to open outwardly against the tension of springs 12 when there is sufficient pressure within the casing 4, and are arranged to again close upon their seats when the pressure within the casing 4 is below that of the pressure outside of the casing.

A casing 12, preferably, surrounds casing 4 in spaced relation therefrom, this latter casing being shown as mounted upon the lower portion of casing 4 which for this purpose is of somewhat greater diameter in order to provide the space 13 between casings 4 and 12. The casing 12, preferably, projects upwardly a substantial distance beyond the upper end of casing 4 to provide a chamber in which is received the impellers for lifting the liquid from the well. The sides of casing 12 are suitably slotted as shown at 14 to permit of the ready intake of the liquid within the well into the space between the casings and into the chamber at the upper end of casing 12.

A casing 15 may be threaded on to the upper end of casing 12 through which casing the liquid lifted by the impellers in casing 12 is arranged to be raised. The casing 15 may extend to any desired height, preferably, to the surface level. Suitable positioning bolts 16 may be threaded through the walls of casing 12 so as to abut against the walls of casing 4 for concentrically positioning the latter casing within the casing 12.

The liquid impelling mechanism of the improved lift comprises a shaft 20 journaled at its lower end in the base 3 and projecting upwardly therefrom through the casing 4 and outwardly through a suitable opening in cap 6 into the space at the upper end of casing 12.

Suitable impellers to any desired number are fixed upon the shaft 20 within this space at the upper end of casing 12. Each of the impellers are shown as comprising a collar 21 arranged to be fixed upon shaft 20 in any desired manner and having blades 22 projecting radially therefrom. The blades 22, preferably, extend approximately to the walls of casing 12 and are suitably curved, so that when shaft 20 and the impellers are rotated the blades will lift the liquid within the casing 12.

The means for rotating shaft 20, preferably, comprises an impeller fixed upon the shaft and received within an air chamber to which compressed air is arranged to be supplied for causing rotation of the impeller and the shaft. As an instance of this arrangement the base 3 may be provided with a recess 25 in its upper end and surrounding shaft 20, this space being arranged to be closed by a cover 26. The impeller received within the air chamber, thus formed, may comprise a collar 27 fixed upon the shaft 20 and having the radially extending curved blades 28 projecting therefrom. The blades 28 are arranged in substantially upright position so that compressed air supplied to the chamber 25 from the side thereof will impinge against the blades for rotating the shaft.

Suitably alined openings 29 and 30 are provided in the base 3 and in casing 4, these openings communicating with the interior of the air chamber 25 so as to provide an air intake to said air chamber. A pipe connection 31 may be threaded into opening 30 and a suitable air pipe 32 extending upwardly to the surface level may be connected to this pipe connection for supplying compressed air for rotating shaft 20. The pipe 32 may be provided with means for supplying a lubricant to the air forced into chamber 25 for lubricating the various movable parts. As an instance of this arrangement a suitable receptacle 33 for the lubricant may communicate with the pipe 32 through a suitable pipe connection 34.

The air impinging against the impeller blades 28 for causing rotation of shaft 20 is arranged, after moving around the chamber 25 with the impeller blades, to be discharged into the casing 4 and from thence outwardly through valves 9 into the head of liquid which is being lifted by the impellers fixed upon the shaft 20. For this purpose a suitable port 36 is provided in the closure 26 at the side thereof opposite the intake port 29.

By the construction as thus described it will be seen that the air supplied to chamber 25 will cause rotation of shaft 20 and the impellers mounted upon this shaft. The rotation of these impellers will lift the head of water within casing 12, this head of water being supplied through the openings 14 from the liquid within the well which is to be raised. The head of liquid thus lifted will be lifted throughout the length of casing 15 irrespective of the length thereof, and when raised to any desired level the liquid may be withdrawn in any suitable manner. As soon as the operation of the lift begins the air discharged through port 36 into casing 4 will open valves 9 and thereby provide a supply of air to be lifted with the head of liquid. When the operation of the lift ceases by shutting off the supply of air into chamber 25 the valves 9 will close and thus prevent the entrance of dirt or sediment into the casing 4.

Various changes may be made without departing from the spirit of the invention as claimed.

What is claimed is:

An air lift for liquid comprising a casing, an air chamber in the base of said casing, a shaft extending through said air chamber and said casing, means for rotating said shaft received within said air chamber, an air supply communicating with one side of said air chamber for actuating said rotating means, a discharge port from said air chamber at the opposite side thereof into said casing, discharge valves in said casing for discharging said air from said casing into the liquid to be raised, and an impeller for raising said liquid upon said shaft beyond said casing.

In testimony whereof I have signed my name to this specification.

RALPH H. TUCKER.